United States Patent [19]

Jain et al.

[11] Patent Number: 5,101,294

[45] Date of Patent: Mar. 31, 1992

[54] SURFACE ACOUSTIC WAVE OPTICAL MODULATOR

[75] Inventors: Faguir C. Jain, Storrs; Kushal K. Bhattacharjee, Windsor, both of Conn.

[73] Assignee: The University of Connecticut, Storrs, Conn.

[21] Appl. No.: 502,316

[22] Filed: Mar. 30, 1990

[51] Int. Cl.$^5$ .......................... G02F 1/11; G02B 6/10
[52] U.S. Cl. ................................. 359/285; 359/313; 385/7
[58] Field of Search ............... 350/358, 96.13; 372/13; 357/4, 6, 17, 30; 310/331 R; 364/821, 822; 359/285, 305; 385/7

[56] References Cited

U.S. PATENT DOCUMENTS

| | | | |
|---|---|---|---|
| 4,327,962 | 5/1982 | Redman et al. | 350/358 |
| 4,532,632 | 7/1985 | Yamashita et al. | 350/358 |
| 4,633,285 | 12/1986 | Hunsinger et al. | 357/26 |
| 4,840,446 | 7/1989 | Nakamura et al. | 350/96.13 |
| 4,926,083 | 5/1990 | Merritt et al. | 350/358 |
| 4,980,596 | 12/1990 | Sacks et al. | 350/358 |

FOREIGN PATENT DOCUMENTS

| | | | |
|---|---|---|---|
| 0003220 | 1/1987 | Japan | 350/96.13 |
| 0314518 | 12/1988 | Japan | 350/96.13 |

OTHER PUBLICATIONS

Miller et al., "Electric Field Dependence of Optical Absorption Near the Band Gap of Quantum-Well Structures", Physical Review B, vol. 32, No. 2, 15 Jul. 1985, pp. 1043-1060.

Kan et al., "Field Effects on the Refractive Index and Absorption Coefficient in AlGaAs Well Structures and Their Feasibility for Electrooptic Device Applications", IEEE Journal of Quantum Electronics, vol. QE-23, No. 12, Dec. 1987, pp. 2167-2179.

Goodhue et al., "Quantum-Well Charge-Coupled Devices for Charge-Coupled Device-Addressed Multiple-Quantum-Well Spatial Light Modulators[a),b)]", J. Vac. Technol. B4(3) May/Jun. 1986, pp. 769-772.

Verber et al., "Correlator Based on an Integrated Optical Spatial Light Modulator", Applied Optics, vol. 20, No. 9, 1 May 1981, pp. 1626-1629.

Cullen et al., "Heterojunction Acoustic Charge Transport Device Technology", 1988 Ultrasonics Symposium, 1988 IEEE, pp. 135-143.

Gordon S. Kino, "Acoustic Waves", Prentice Hall (1987), pp. 502-529.

Anthony J. DeMaria, "Photonics Vs. Electronics Technologies", Optics News, Apr. 1989, pp. 22-37.

Jacques I. Pankove, "Optical Processes in Semiconductors", Photon-Phonon Interactions in Semiconductors, Sec. 12-B, pp. 275-278.

G. A. Sai-Halasz, "Semiconductor Superlattices", Intst. Phys. Conf. Ser. No. 43, 1979, Chapter 1, pp. 21-30.

Edited by Hartmut Haug, "Optical Nonlinearities and Instabilities in Semiconductors", Academic Press, Inc., 1988, Chap. 4, Nonlinear Optical Properties of Semiconductor Quantum Wells, pp. 83-120, Chap. 13, Electric Field Dependence of Optical Properties of Semiconductor Quantum Wells: Physics and Applications, pp. 325-359.

*Primary Examiner*—Rolf Hille
*Assistant Examiner*—Tan Ho
*Attorney, Agent, or Firm*—Perman & Green

[57] ABSTRACT

An acousto-optic modulator is described which comprises a first support layer and a second layer of piezoelectric semiconductor material disposed over the support layer. The second layer includes a plurality of active sublayers, each active sublayer having a planar surface and thickness dimension which is such as to enable the active layer to exhibit quantum-well effects. A surface acoustic wave structure is disposed on the second layer for creating an acoustic wave in the second layer. The acoustic wave induces electric field variations therein which are perpendicular to the planar surface of the active sublayers and alter an optical property thereof. An optical beam is directed through the second layer, which beam is modulated by the altered optical properties of the active sublayers.

18 Claims, 6 Drawing Sheets

SURFACE ACOUSTIC WAVE OPTICAL MODULATOR

FIELD OF THE INVENTION

This invention relates to optical modulators, and more particularly, to optical modulators which employ a semiconductor superlattice whose optical properties can be affected by induced electrical fields.

BACKGROUND OF THE INVENTION

Semiconductor superlattice devices are well known in the art and comprise portions of light emitting devices, light modulators etc. A compositional superlattice is a periodic array of ultra- thin layers of two different semiconductors in alternation. Each layer is about a hundred Angstroms thick to enable quantum effects to govern their electronic properties. The periodic alternation of layers gives rise to a periodic variation of electric potential, and each layer with the smaller band gap produces what is called a quantum or potential well. The most widely used superlattice devices employ thin layers of GaAs interspersed between layers of AlGaAs. Typically, the thickness of each GaAs layer is approximately 50-100 Angstroms with the AlGaAs layer thickness being in the same range.

Recently, others have found that the excitonic optical absorption and refractive index characteristics of a superlattice multiple quantum-well (MQW) device can be altered by the application of electric fields, either perpendicular to the superlattice planes or parallel thereto (referred to as the Stark effect). A comprehensive study of these phenomena can be found in "Electric Field Dependence of Optical Absorption Near the Band Gap of Quantum-Well Structures", Miller et al. Physical Review B, Vol. 32 No. 2, pp. 1043-1060, 15 July, 1985. FIG. 1 herein illustrates a device structure used by Miller et al. to investigate the effects of a perpendicular electric field on the optical properties of an MQW structure.

In FIG. 1, an MQW active region 10 comprises a plurality of GaAs/AlGaAs layers with each GaAs layer being 29 Angstroms in thickness and each AlGaAs layer being 69 Angstroms. On either side of MQW region 10 is a pair of superlattice buffer regions 12 which are, in turn, sandwiched between a pair of p and n-type contact layers 14. A further AlGaAs p+ contact region 16 forms a support for contact metallization 18. An optical beam 20 enters the semiconductor structure via opening 22 in metallization layer 18. On the opposite side of the structure, an AlGaAs n+ region is employed as an etch stop. A further GaAs n+ buffer region is positioned adjacent a GaAs substrate n+ region which, in turn, provides the support for contact metallization 30. The optical beam exits from region 24, as indicated by arrow 32.

While the Miller et al. paper describes the effects of applied, perpendicular and parallel electric fields on the optical properties of excitons confined in the MQW region 10, it is the effect of the perpendicularly applied electric field which is most interesting. Referring to FIG. 2, there is reproduced from Miller et al., a plot of absorption spectra at various electric field values for a perpendicularly applied field to the structure shown in FIG. 1. The perpendicular electric field is created by applying an appropriate DC bias between contacts 18 and 30. Curve 40 indicates the absorption coefficient as function of the incident photon energy for the structure of FIG. 1 with an applied electric field of approximately $1 \times 10^4$ V/cm. Curves 42 and 44 show changes in the absorption coefficient for MQW layer 10, as the applied field is increased to $4.7 \times 10^4$ V/cm and $7.3 \times 10^4$ V/cm, respectively. The zero lines 46 and 44 for curves 42 and 44 are displaced from zero line 48 for clarity's sake.

As the applied electric field is increased, there is a substantial decrease in photon energy of the peak absorption coefficient for MQW layer 10. Thus, if an optical beam exhibiting a photon energy of approximately 1.45 eV is applied to the device of FIG. 1, and the electric field is varied between the values for curves 40 and 42, the absorption of that beam will vary significantly for the two different field values. High field values are required to achieve the significant changes in absorption coefficient due to the fact that the optical beam interacts with excitons in a very narrow thickness of MQW region.

Further investigation of a structure similar to that of Miller et al. is described in "Field Effects o the Refractive Index and Absorption Coefficient in AlGaAs Quantum Well Structures and Their Feasibility for Electrooptic Device Applications", Kan et al., IEEE Journal of Quantum Electronics, Vol. QE-23, No. 12, Dec. 1987, pp. 2167-2179 Kan et al. investigated the changes of both absorption coefficient $\alpha$ and refractive index n for a superlattice device similar to that shown in FIG. 1. Those results are reproduced in FIGS. 3 and 4.

In FIG. 3, changes in both refractive index and absorption coefficient are plotted against wavelength. Curve 50 shows the variation of refractive index n over various wavelengths when no electric field is applied Dotted curve 52 shows changes in refractive index n when the applied field is increased to $6 \times 10^4$ V/cm. Curves 54 and 56 in FIG. 3 show the corresponding changes in absorption coefficient $\alpha$ for identical changes in the electric field value, as plotted against wavelength of the applied light.

In FIG. 4, the refractive index variation $\Delta n$ and absorption variation $\Delta \alpha$ is plotted against wavelength. It can be seen that the change varies in $\Delta n$ varies significantly between approximately 843 nm to 850 nm and the absorption variation $\Delta \alpha$ varies significantly between approximately 847 nm to 852 nm.

The results of Kan et al. show, for selected wavelengths, that both the absorption coefficient and refractive index of a superlattice MQW structure can be significantly altered by the application of a perpendicular electric field For instance, as shown by curves 50 and 52, at 850 nm the refractive index varies significantly when an applied perpendicular electric field is varied. Kan et al. suggest the use, as a modulator, of a structure similar to that in FIG. 1. As with Miller et al. a high value perpendicular electric field is required to accomplish the desired modulation due to the short interaction length between MQW region and the optical beam.

A further application of this type of structure is considered in "Quantum-Well Charge Coupled Devices for Charge-Coupled Device Addressed Multiple-Quantum-Well Spatial Light Modulators", Goodhue et al., Journal of Vacuum Science Technology, B4(3), May/June 1986, pp. 769-772. Goodhue et al. describe a spatial light modulator which employs an MQW region, on which a charge-coupled-device (CCD) shift register has been constructed. The CCD shift register has interspersed opaque and transparent electrical contacts. Thus, when a signal charge packet in the channel is transported under the transparent electrode, it modifies the magnitude of the perpendicular electric field into the MQW layers which, in turn, alters its absorption characteristics. Light passing through the transparent CCD electrode and into the MQW is thus selectively, locally absorbed, depending upon the voltage present on the transparent electrode By necessity, the CCD modulation structure covers a significant portion of the face of the device and restricts the amount of surface area available for light modulation In addition, it requires 3-phase clock circuitry and associated lithography to transport charge packets.

Another type of prior art optical modulator is the acousto-optic modulator that employs a surface acoustic wave (SAW) to modulate an optical signal. Such a structure is described in "Correlator Based on an Integrated Optical Spatial Light Modulator", Verber et al., Applied Optics, Vol. 20, No. 9, 1 May, 1981, pp. 1626–1629. Verber et al. employ a SAW structure on lithium niobate to induce electric fields therein, which fields diffract an optical beam. The modulator divides a single broad beam, incident at the Bragg angle, into two angularly separated beams. The SAW is modulated with a binary data pattern, so that optical beam segments which encounter either two gratings or no gratings, exit at the same angle they entered, while beams which encounter only one grating are deflected by twice the Bragg angle. The effect used in Verber's device is not based on confined excitonic phenomena taking place only in MQW structures.

A further development in SAW devices is disclosed in U.S. Pat. No. 4,633,285 to Hunsinger et al. and in "Heterojunction Acoustic Charge Transport Device Technology", Cullen et al., 1988 Ultrasonics Symposium, pp. 135–143, 1988, IEEE. Both Hunsinger et al. and Cullen et al. employ the piezoelectric properties of a GaAs/AlGaAs semiconductor structure to configure a SAW device. Both show the use of a buried channel of GaAs disposed between confining AlGaAs layers. A surface acoustic wave is induced in the buried channel and electric charges are injected therein via a Schottky barrier contact. The surface acoustic wave carries the injected charges along the channel to a sensing electrode. In addition to being employed as a delay line, Hunsinger et al. also disclose the use of the SAW structure as an image detector, such that light falling upon the structure causes charges to be injected into the buried channel and carried along by the surface acoustic wave.

To the inventors' knowledge, no prior art has combined the benefits accruing from the use of a surface acoustic wave device and an MQW structure hosting confined excitons to perform optical modulation.

Accordingly, it is an object of this invention to provide an improved SAW-based, acousto-optic light modulator.

It is a further object of this invention to provide an improved acousto-optic light modulator which makes use of electric-field induced variations in the optical properties of an MQW structure.

It is still another object of this invention to provide an acousto-optic modulator particularly adapted for integration into monolithic semiconductor structures.

SUMMARY OF THE INVENTION

An acousto-optic modulator is described which comprises a first support layer and a second layer of piezoelectric semiconductor material disposed over the support layer. The second layer includes a plurality of active sublayers, each active sublayer having a planar surface and thickness dimension which is such as to enable the active layer to exhibit quantum-well excitonic effects. A surface acoustic wave transducer structure is disposed on the second layer for creating an acoustic wave in the second layer The acoustic wave induces electric field variations in the active sublayers which in turn alter the optical properties thereof. An optical beam is directed through the second layer, which beam is modulated by the altered optical properties of the active sublayers.

DETAILED DESCRIPTION OF THE INVENTION

As indicated in the introduction hereto, MQW structures are known to exhibit significant changes in both absorption coefficient and refractive index as the result of an application of a perpendicular electric field. In the structures to be discussed below, a surface acoustic wave is employed to induce a perpendicular electric field manifestation in the MQW structure. This enables optical modulation to occur through changes in either the refractive index or the absorption coefficient of the active layers within the MQW structure.

Figure 5:
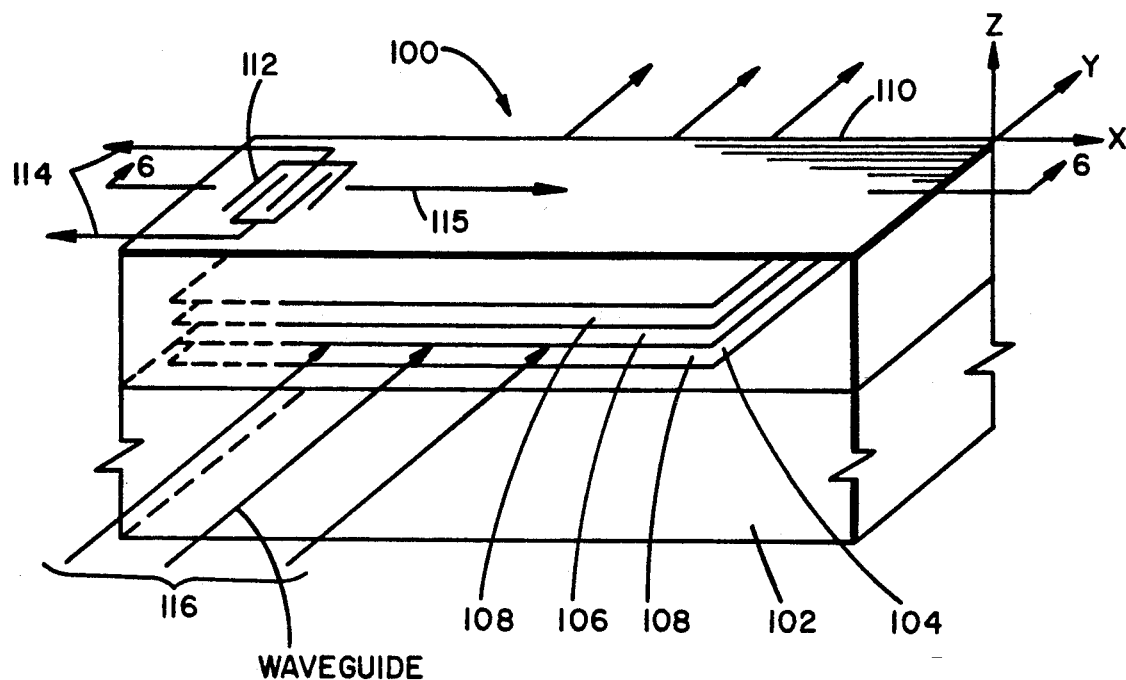
FIG. 5 is a schematic perspective view of a side entry MQW optical modulator structure constructed in accordance with the invention.
Figure 6:
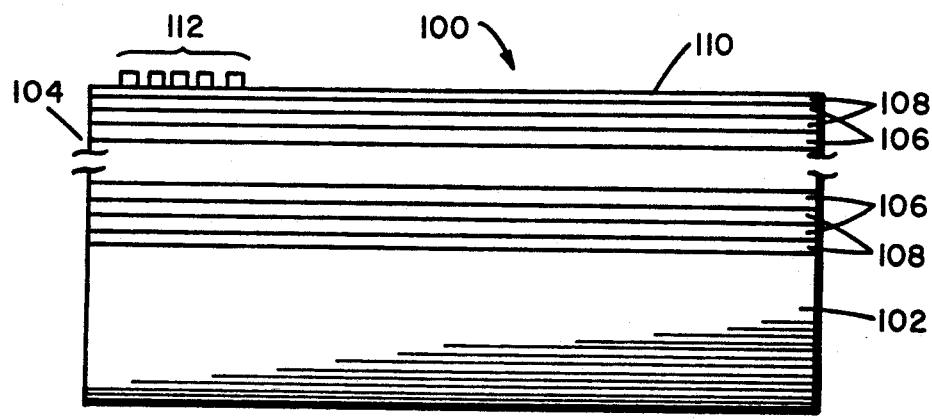
FIG. 6 is a section of the structure of FIG. 5 taken along line 6—6.

Turning now to FIGS. 5 and 6, MQW optical modulator 100 includes a substrate 102 on which an active MQW region 104 has been grown. Substrate 102 may typically be an undoped or semiinsulating GaAs with MQW region 104 grown thereon by an appropriate process, i.e., molecular beam epitaxy or metalorganic chemical vapor deposition (MOCVD). As shown in more detail in FIG. 6, MQW region 104 comprises a plurality of active GaAs layers 106 which are sandwiched between confining AlGaAs layers 108. It is the active GaAs layers 106 which exhibit the quantum confined Stark effect (QCSE) alteration in absorption coefficient and refractive index, and which, as will be hereinafter understood, act upon an incident optical beam of appropriate wavelength to alter its angle of incidence or level of absorption.

Disposed on uppermost surface 110 of MQW modulator 100 are a plurality of interdigitated SAW transducers 112, which are energized from an appropriate source via conductors 114. Using this arrangement, a surface acoustic wave may be launched directly on (and into) MQW region 104 along the X direction, indicated by arrow 115. While not shown, a reflector may be positioned behind transducer 112 to assure in-phase addition of the portion of the surface acoustic wave which is induced and travels in the direction opposite to arrow 115. The surface acoustic wave induced in MQW region 104 creates both parallel and perpendicular electric fields which extend into the depth thereof and effect the optical properties of excitons hosted in active layers 106 disposed therein.

Figure 7:
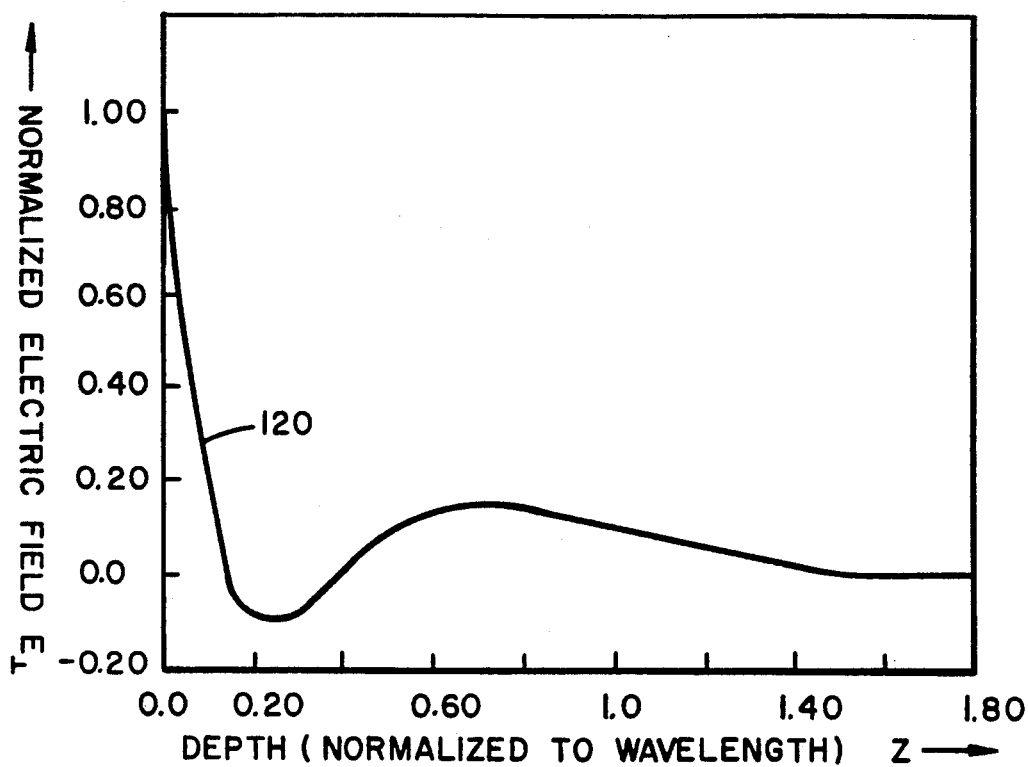
FIG. 7 is a plot of perpendicular electric field vs. depth, showing the variation of field strength with depth into the structure of FIG. 5, as normalized to the applied wavelength.

In FIG. 7, a plot is shown of the normalized perpendicular electric field induced in MQW region 104 vs. the depth of MQW region 104 (normalized to the applied wavelength of the SAW signal). From curve 120, it can be seen that the perpendicular electric field is strongest in MQW region 104 which has a thickness of approximately 10% or less of the wavelength of the applied SAW frequency. Thus, the major optical effects induced by the perpendicular electric field are experienced at or less than that depth in MQW region 104.

Returning to FIG. 5, an optical beam (arrows 116) is directed at the side of MQW device 100 in the Y direction so that it is orthogonal to the surface acoustic wave which propagates in the X direction therethrough. The beam may emanate from an optical waveguide or any other appropriate source of optical energy. By applying the optical beam 116 along the Y axis of the structure, the beam is acted upon by active regions 106 over their full planar width. As a result, the perpendicular electric field required to achieve the desired modulation effect on optical beam 116 can be lessened due to the much greater interaction length between the beam and the active modulating region.

Figure 1:
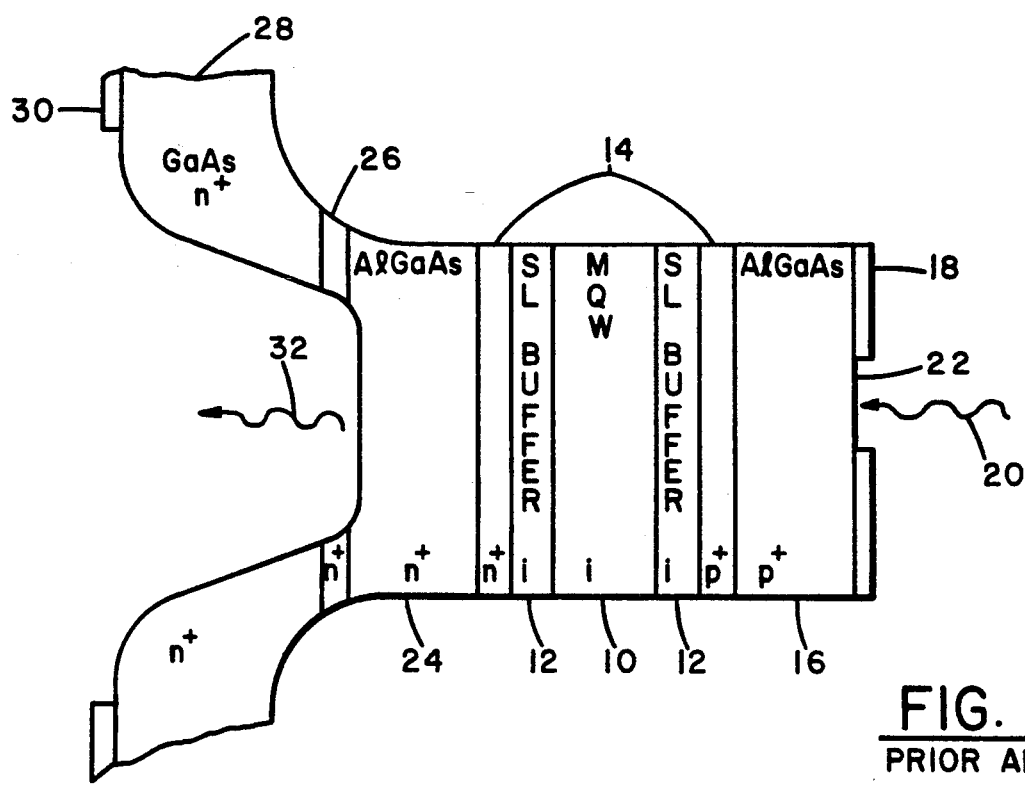
FIG. 1 is a section of a prior art MQW optical modulator.
Figure 2:
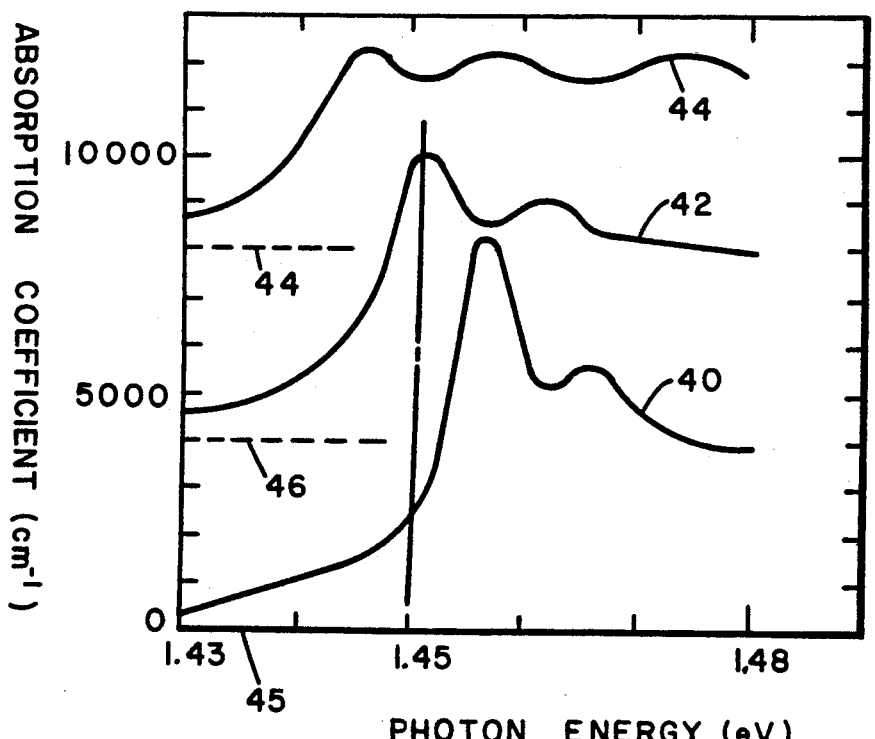
FIG. 2 is a plot of photon energy vs. absorption coefficient for the device of FIG. 1.
Figure 3:
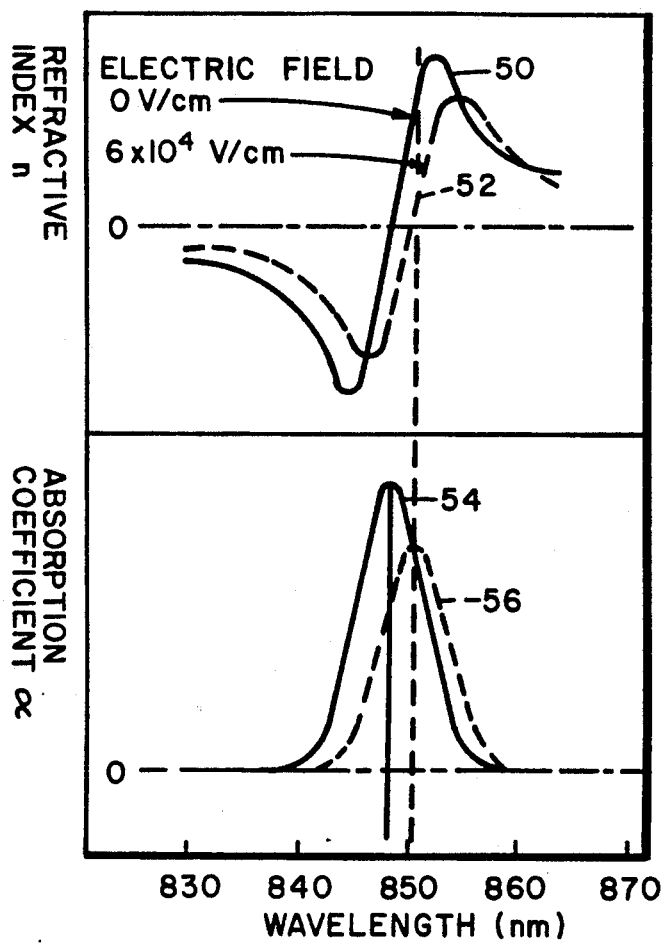
FIG. 3 is a plot, for different applied electric fields, of wavelength vs. absorption coefficient and refractive index for a prior art device similar to that shown in FIG. 1.
Figure 4:
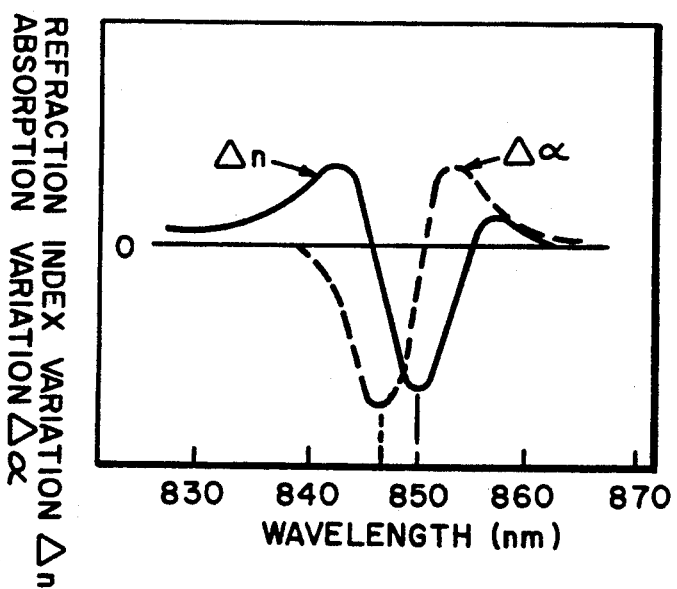
FIG. 4 is a plot of wavelength vs. refractive index variation and absorption variation for a prior art device similar to that shown in FIG. 1.

The surface acoustic wave signal inducing the electric field into MQW region 104 must be sufficient to cause the shifts in refractive index and/or absorption coefficient illustrated in FIGS. 3 and 4. The preferred structure, as shown, requires no external biasing of the modulator such as used in p-i-n type optical modulators. Typical dimensions and frequencies for the device shown in FIG. 5 are listed in Table 1 below.

In operation, SAW transducer 112 is energized and launches a surface acoustic wave in the X direction, which wave induces perpendicular electric field variations within MQW region 104 as it propagates along the device. The perpendicular electric field modifies the excitonic absorption coefficient of active regions 106, thereby causing them to periodically absorb and modulate the intensity of optical beam 116.

Figure 8:
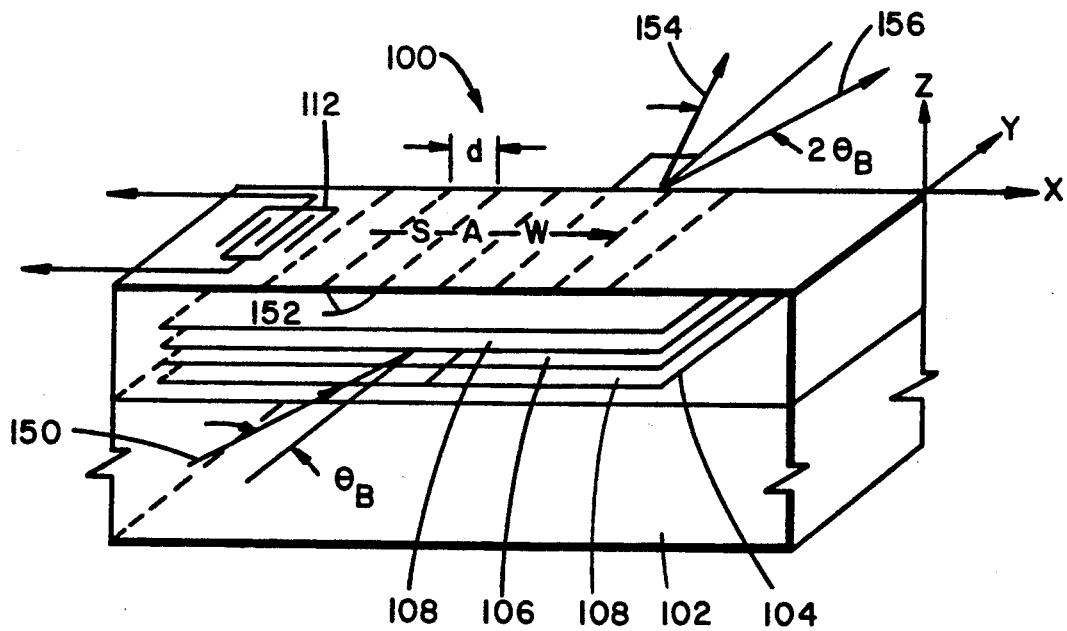
FIG. 8 is a schematic perspective view of the modulator of FIG. 5 when it is employed as a Bragg angle modulator.

Turning now to FIG. 8, the optical modulator of FIG. 5 employ changes in its refractive index rather than its absorption coefficient to provide optical beam modulation. As above stated, SAW transducer 112 launches a surface acoustic wave in region 104, with its wavefronts being schematically shown by dotted line 152. In this instance, optical beam 150 is directed so that it exhibits an angle $\theta_B$ with respect to surface acoustic wavefronts 152, $\theta_B$ being equivalent to the Bragg angle. In other words, light beam 150 is in the XY plane but is offset from the Y axis b $\theta_B$. The Bragg angle $\theta_B$ can be determined from the equation $\lambda n = \Lambda \sin \theta$, where n = the order of diffraction (n=1 being the most significant case)

$\lambda$ = the wavelength of the light in the medium $\Lambda$ = the SAW wavelength (distance between adjacent wavefronts).

As each wavefront 152 propagates down the X direction of modulator 100, it induces a perpendicular electric field which modifies the refractive index of the active optical areas 106 and makes those regions appear as an optical grating. As a result incoming optical beam 150 is Bragg diffracted (first order) as shown by arrow 154. In the absence of a surface acoustic wave, the exiting optical beam intensity is undiffracted and is illustrated by arrow 156, with the angle between optical beams 154 and 156 being $2\theta_B$.

Table 1, below, gives $\Delta n/n$ values as a function of the perpendicular field for a GaAs/AlGaAs MQW modulator having a one GHz SAW at power levels of 10 and 20 mW. The values of $\Delta n/n$ are for the GaAs quantum-wells. Adjustments should be made to account for the inactive volume, i.e., the volume of the AlGaAs barrier layers which sandwich the GaAs quantum-wells.

TABLE 1

| Total SAW Power P mW | SAW Frequency fHz | w/Λ | $E_\parallel \times 10^4$ V/cm | $E_\perp \times 10^4$ V/cm | $\Delta n/n$ |
|---|---|---|---|---|---|
| 10 | 400 MHz | 10 | 0.7 | 0.88 | — |
| 20 | 400 MHz | 10 | 0.989 | 1.244 | — |
| 10 | 1 GHz | 10 | 1.75 | 2.2 | 0.81% |
| 20 | 1 GHz | 10 | 2.47 | 3.11 | 1.15% | w = Transducer Aperture = 27 μm at 16 GHz
Λ = SAW Wavelength = 2.8 μm at 1 GHz

It is to be noted that n and $\alpha$, and changes in their magnitudes in the presence of a perpendicular electric field are dependent on the operating wavelength of the optical beam as well as the parameters of the MQW layers. Generally, maximum values of $\Delta$ n occur at wavelengths which are associated with significant absorption coefficient values. For the Bragg modulator shown in FIG. 8, the operating wavelength and MQW parameters should be selected such that the losses due to absorption are reasonable over the interaction length, even if $\Delta n$ values are somewhat lower.

Figure 9:
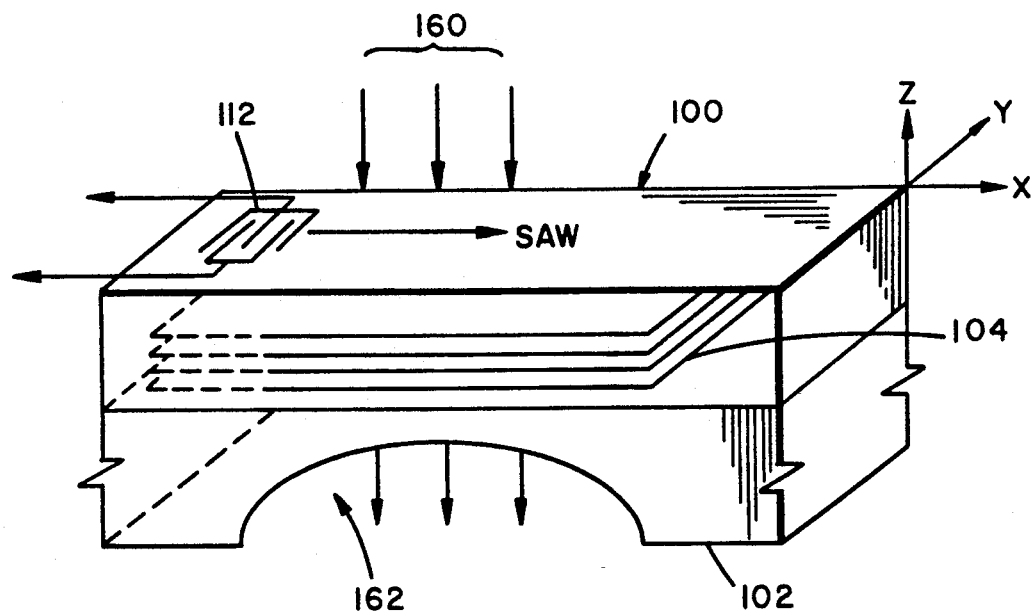
FIG. 9 is a schematic perspective view of a top entry optical modulator structure constructed in accordance with the invention.

Turning now to FIG. 9, a further embodiment of the invention is shown which employs a top-oriented normal optical beam configuration rather than the side entries shown in FIGS. 5 and 8. In this instance, arrows 160 represent the optical beam and indicate its entry into the modulator structure normal to the XY plane of MQW region 104. Because substrate 102 is comprised of GaAs which is an absorber of optical frequencies, a portion of it is etched away to produce a concave area 162 through which optical beam 106 can exit from modulator 100.

The operation of the modulator of FIG. 9 is much the same as previously described with respect to FIG. 5 except that, in this instance, it is the alteration of the absorption coefficient $\alpha$ which is utilized. Furthermore, the interaction length of optical beam 160 with MQW region 104 is much shorter than for the side entry beam configuration of FIG. 5. As a result, higher electric fields are required to achieve significant absorption of optical beam 160 as it passes through structure 100. The modulation of the absorption coefficients is, as aforedescribed, achieved by propagating SAW wavefronts down the X dimension of modulator 100, so that the induced perpendicular electric fields modify the absorption coefficients of the interspersed active regions 106.

Figure 10:
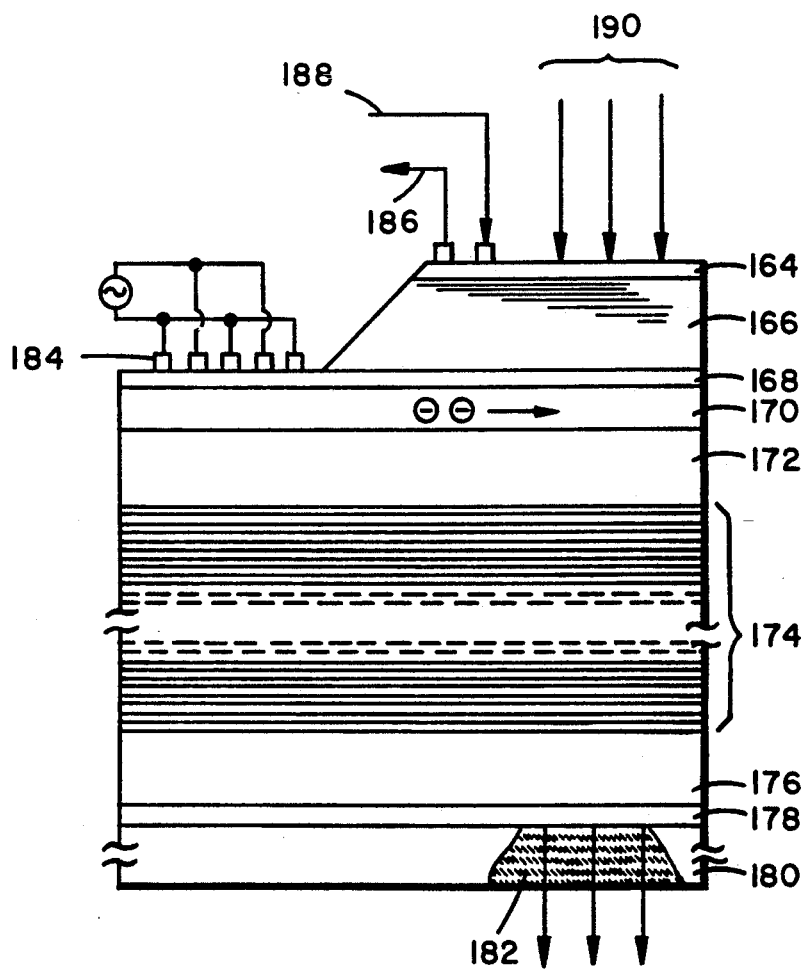
FIG. 10 is a sectional view of a further embodiment of the top entry modulator which employs a buried channel-SAW structure.

In FIG. 10, another embodiment of the invention is shown which also employs a normal entry, optical beam configuration. This modulator structure comprises two parts, one including a SAW configuration similar to that described by Hunsinger et al. and Cullen et al. and a second including an MQW structure such as that described above. In specific, the modulator structure includes an undoped GaAs cap 164 which is positioned over an n doped AlGaAs layer 166. That is followed by an undoped AlGaAs spacer layer 168 which is in turn positioned on a GaAs channel region 170. The surface acoustic waves generated by the transducer 184, carry charge packets along into the modulating region (the region through which optical beam 190 passes). GaAs region 170 is followed by an undoped AlGaAs layer which forms one boundary of an MQW region 174 (approximately 40–60 layers). A p-doped AlGaAs layer 176 supports MQW region 174 and it is, in turn, followed by an AlGaAs buffer layer 178 which rests on GaAs substrate 180. Substrate 180 is etched to provide a concave area 182 for the same reasons given for the device of FIG. 9.

In the manner described by Hunsinger et al. and Cullen et al., a SAW transducer 184 induces a surface acoustic wave into GaAs channel region 170 and an input ohmic source 186 and Schottky charge control source 188 serve to inject charge packets into region 170. Those charge packets are transported along region 170 by the induced surface acoustic waves therein.

The magnitude of a propagating charge packet controls the magnitude of the electric field in MQW layers 174. This in turn affects the excitonic absorption experienced by the optical beam 190 in those layers and, effects the modulation of beam 190.

Figure 11:
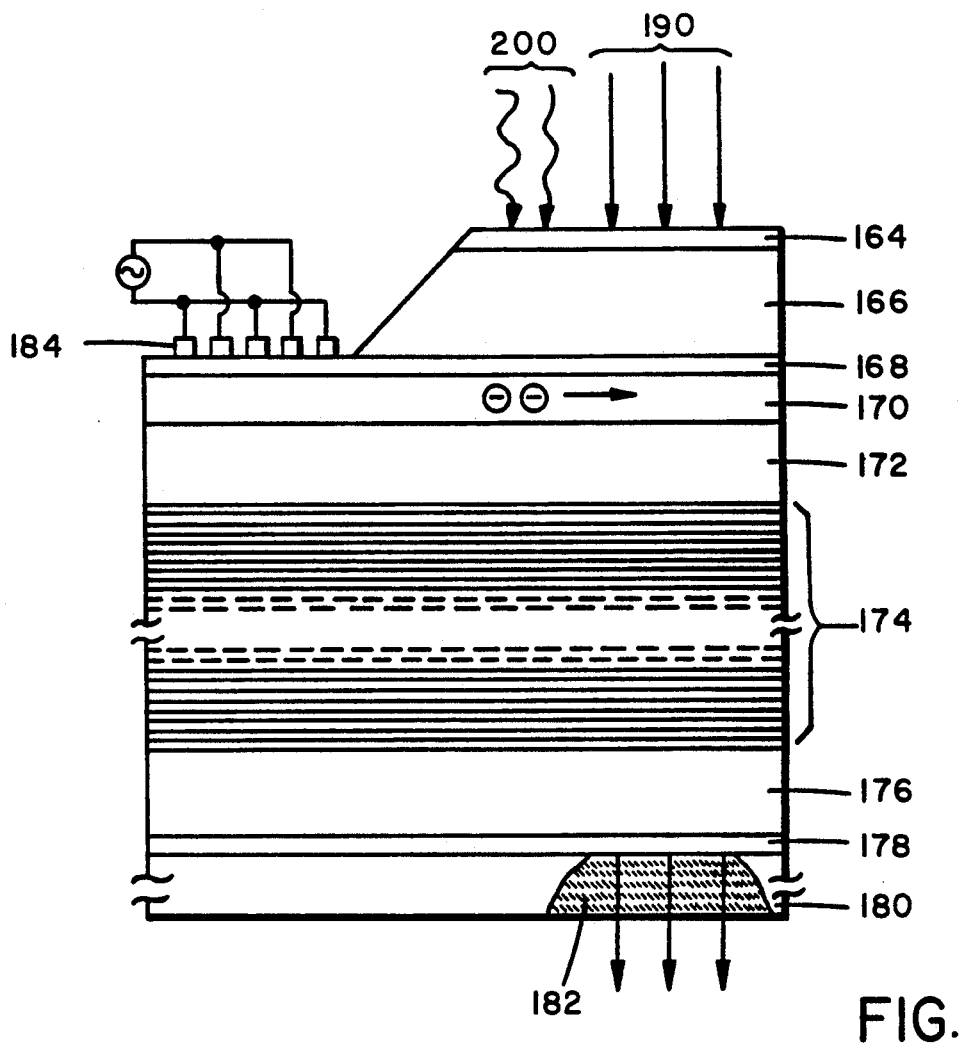
FIG. 11 is a version of the device of FIG. 10 employing optical injection.

Turning now to FIG. 11 a modulator structure is shown which is substantially identical to that shown in FIG. 10 except that both the ohmic and Schottky signal inputs have been removed and an imaging signal/control beam 200 is applied to insert charge packets into the channel 170. The charge packets are transported in the channel by SAW and the optical beam 190 is modulated in a manner described for FIG. 10.

Figure 12:
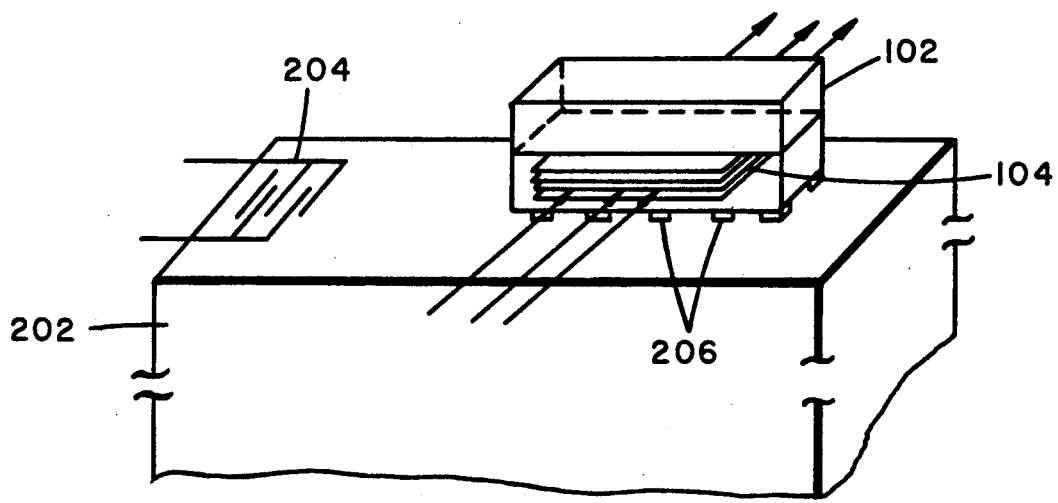
FIG. 12 is a schematic perspective view of a conventional SAW structure on which an MQW modulator is positioned with the superlattice structure placed face down.

In FIG. 12, still another embodiment of the invention is shown wherein a modulator 100 (i.e. the same as shown in FIG. 5) is mounted on a piezoelectric (e.g., lithium niobate) substrate 202. Here it will be noted that the SAW transducers have been removed from modulator 100 and emplaced upon the upper surface of substrate 202. The gap between the upper surface of substrate 202 and the modulator 100 is realized by sparsely placed dielectric (e.g. SiO$_2$) spacers 206. The thickness of the spacers is of the order of 2000Å. Substrate 202 exhibits a much larger piezoelectric effect than the GaAs/AlGaAs structure of device 100. Therefore, when SAW transducer 204 induces a surface acoustic wave in substrate 202, that wave, as it passes beneath device 100, induces a perpendicular electric field thereinto and alters the absorption and diffraction characteristics thereof. Thus, by relying upon the much higher field densities generated by the induced wave within substrate 202, the SAW transducer on device 100 can be dispensed with, while still maintaining the optical modulation properties of device 100.

It should be understood that the foregoing description is only illustrative of the invention. Various alternatives and modifications can be devised by those skilled in the art without departing from the invention. For instance, the magnitude of the surface acoustic wave-induced electric field can be enhanced in modulator 100 by depositing a thin layer of zinc oxide over the MQW layers and then emplacing the SAW transducers thereon. Accordingly, the present invention is intended to embrace all such alternatives (such as Raman-Nath diffraction), modifications and variances which fall within the scope of the appended claims. The MQW material system may be chosen from other semiconductor systems such as InGaAs/InP, InGaAsP/InP, ZnSe/GaAs etc. Strained layer multiple quantum wells may also be used in lieu of non-strained MQW layers.

We claim:

1. An acousto-optic modulator for modulating an optical beam from an external source, said modulator comprising:

a first support layer;

a second layer of piezoelectric semiconductor material disposed over said support layer for receiving said optical beam, said second layer including a plurality of active sublayers, each said active sublayer having a planar surface and thickness dimension, said thickness dimensions being such as to enable said active sublayers to host excitons which exhibit Stark effects and enable said active layer's optical absorption and refractive properties to be altered by an applied electric field; and means for launching a surface acoustic wave in said second layer, said wave inducing an electric field in said second layer which alters an absorption/refraction property of said active sublayers to thereby modulate said optical beam.

2. The acousto-optical modulator as defined in claim 1 wherein said electric field is induced in said second layer in a direction perpendicular to said planar surface thereof.

3. The acousto-optic modulator as defined in claim 2, wherein said optical beam is oriented in a direction parallel to said planar surface of said active sublayers.

4. The acousto-optic modulator as defined in claim 3, wherein said launching means is a SAW transducer which includes a plurality of wavefronts into said second layer, each said wavefront inducing a perpendicular electric field into said second layer.

5. The acousto-optic modulator as defined in claim 4, wherein said optical beam is incident at an angle which is orthogonal to a side of said acousto-optic modulator.

6. The acousto-optic modulator as defined in claim 4, wherein said optical beam is incident at a Bragg angle $\theta_B$ with respect to said wavefronts, said Bragg angle $\theta_B$ being derivable from the expression $n\lambda = 2\Lambda \sin \theta_B$ where: n is the order of diffraction, $\lambda$ is the wavelength of the optical beam in the second layer, and $\Lambda =$ SAW wavelength between said wavefronts.

7. The acousto-optic modulator as defined in claims 5 or 6, wherein said SAW transducer is arrayed on said second layer.

8. The acousto-optic modulator as defined in claim 2, wherein said optical beam is incident at a perpendicular angle to said planar surface of said active sublayers.

9. The acousto-optic modulator as defined in claim 8, wherein said induced perpendicular electric field alters the absorption coefficient of said active regions to enable modulation of said optical beam by said induced field.

10. The acousto-optic modulator as defined in claim 9, wherein said first support layer includes a concave portion through which said optical beam is directed, said concave portion reducing absorption of said optical beam by said first support layer.

11. The acousto-optic modulator as defined in claim 10, wherein said launching means induces a plurality of wavefronts into said second layer, each said wavefront inducing a perpendicular electric field into said second layer.

12. The acousto-optic modulator of claim 11, wherein said launching means is an inter-digitated SAW transducer arrayed on said second layer.

13. The acousto-optic modulator as defined in claim 1, wherein said launching means comprises:
a third layer of piezoelectric semiconductor material disposed over said second layer;
a conductive barrier layer disposed over said third layer and defining a channel in said third piezoelectric conductor material beneath the barrier layer; and
means for injecting into said channel an input electrical signal, said launching means establishing a surface acoustic wave layer that propagates through said channel, which wave carries packets of charge from said input signal, said packets of charge inducing electric field variations in said second layer.

14. The acoustic-optic modulator as defined in claim 13, wherein said injection means comprises signal means for applying a voltage to said channel.

15. The acousto-optic modulator as defined in claim 13, wherein said injection means comprises a source of radiant energy.

16. The acousto-optic modulator of claim 13 where said optical beam is incident at a perpendicular angle to said planar surface of said active sublayers.

17. The acousto-optic modulator as defined in claim 1, wherein said launching means comprises:
a separate piezoelectric crystal having an interdigitated SAW transducer fabricated thereon, said second layer and first support layer positioned on said crystal, located remote from said transducer, and in the path of a surface acoustic wave generated thereby.

18. The acousto-optic modulator of claim 17, wherein said second layer is spaced from said separate piezoelectric crystal by dielectric spacers.

* * * * *